United States Patent
Kitao et al.

(10) Patent No.: US 7,245,997 B2
(45) Date of Patent: Jul. 17, 2007

(54) REMOTE MONITORING SYSTEM AND METHOD

(75) Inventors: Junichi Kitao, Kariya (JP); Ifushi Shimonomoto, Okazaki (JP); Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 7 days.

(21) Appl. No.: 11/137,392

(22) Filed: May 26, 2005

(65) Prior Publication Data

US 2005/0273219 A1    Dec. 8, 2005

(30) Foreign Application Priority Data

Jun. 7, 2004    (JP)    ............... 2004-168778

(51) Int. Cl.
  *G06F 7/00*    (2006.01)
  *G06F 17/00*    (2006.01)

(52) U.S. Cl. ............... 701/29; 701/2; 701/33; 701/36; 340/426.13; 340/426.14; 340/426.16; 340/426.17; 340/426.2; 340/426.28; 340/426.29; 340/426.35; 340/426.36; 455/95; 455/99; 455/556.1; 455/556.2; 455/557

(58) Field of Classification Search ............ 340/426.13–426.36; 701/2; 455/95, 99, 556.1–557
See application file for complete search history.

(56) References Cited

U.S. PATENT DOCUMENTS 5,808,564 A * 9/1998 Simms et al. ............... 340/990
5,917,405 A * 6/1999 Joao ............... 340/426.17
6,161,005 A * 12/2000 Pinzon ............... 455/403
6,308,083 B2 * 10/2001 King ............... 455/556.1
6,542,077 B2 * 4/2003 Joao ............... 340/426.16
6,567,012 B1   5/2003 Matsubara et al.
6,639,511 B2 * 10/2003 Haruna et al. ......... 340/426.13
6,853,853 B1 * 2/2005 Van Wiemeersch et al. ............... 455/569.2
6,873,824 B2 * 3/2005 Flick ............... 455/41.2
6,885,285 B2 * 4/2005 Losey ............... 340/5.72
2002/0163449 A1 * 11/2002 Flick ............... 340/988
2002/0190873 A1 * 12/2002 Flick ............... 340/988
2005/0156715 A1 * 7/2005 Zou et al. ............... 340/426.19

FOREIGN PATENT DOCUMENTS

JP    A-2002-281166    9/2002

* cited by examiner

*Primary Examiner*—Jack Keith
*Assistant Examiner*—Chuong Nguyen
(74) *Attorney, Agent, or Firm*—Posz Law Group, PLC

(57) ABSTRACT

A smart key carried with a user is provided with switches for monitoring a vehicle in remote places, such as a departure-time monitor switch, a return-time monitor switch and an all item monitor switch. The switches are associated with monitor information indicating various vehicle states. When the departure-time monitor switch is operated, the cellular phone receives monitor information such as parking position, rainfall state, etc. useful to the user at departure time from the vehicle. Similarly, when the return-time monitor switch is operated, the cellular phone receives monitor information useful at return time such as door open/closed state and lock state. When the all item monitor switch is operated, the cellular phone receives monitor information of all monitor items.

10 Claims, 10 Drawing Sheets

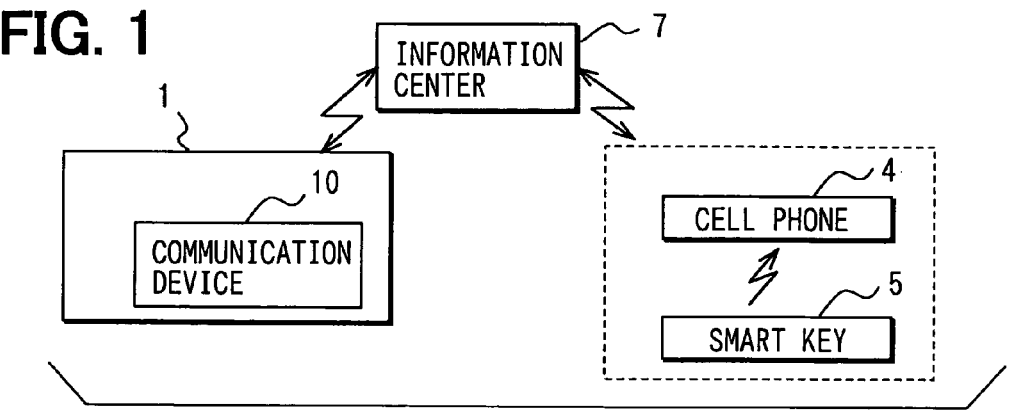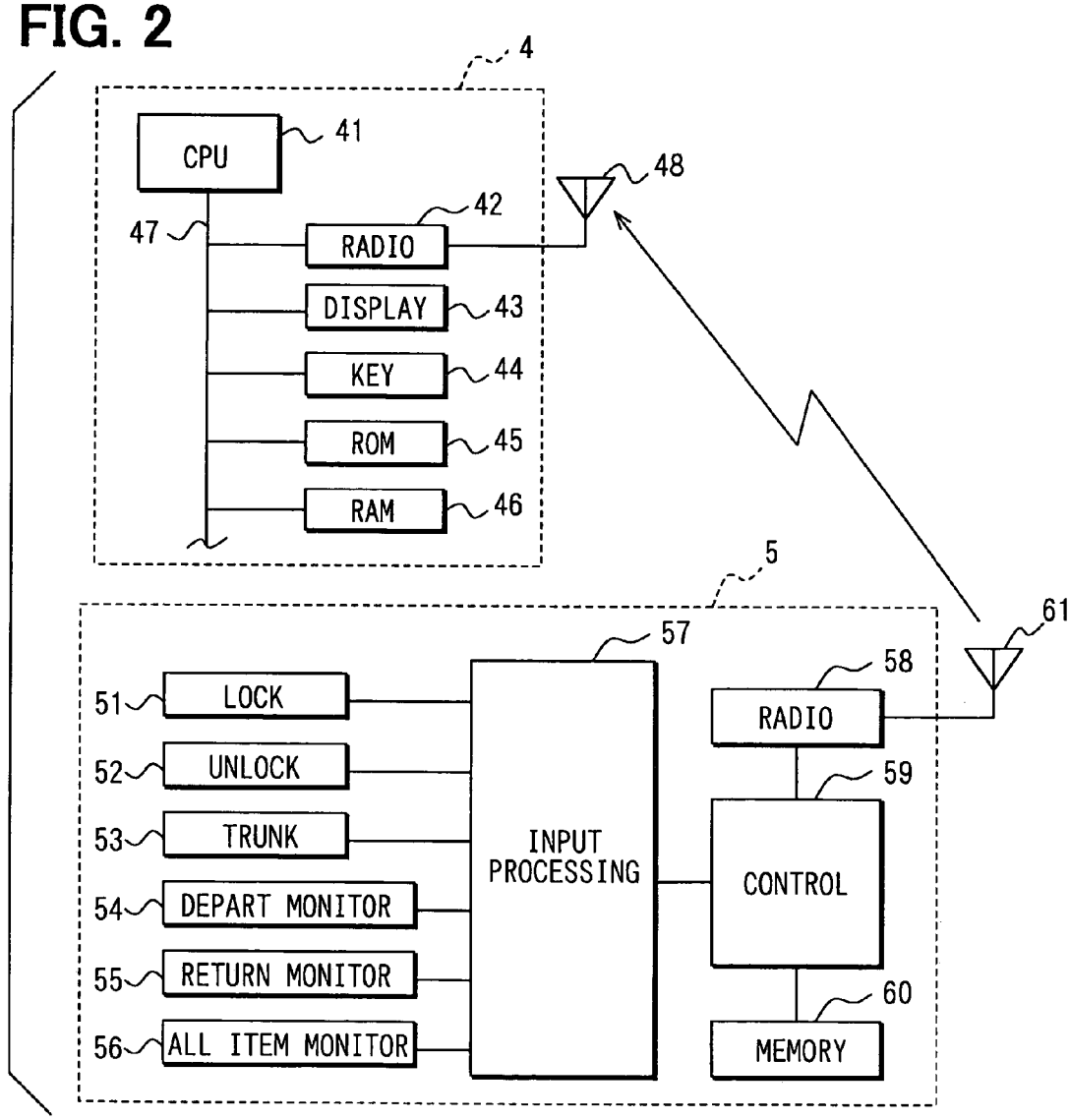

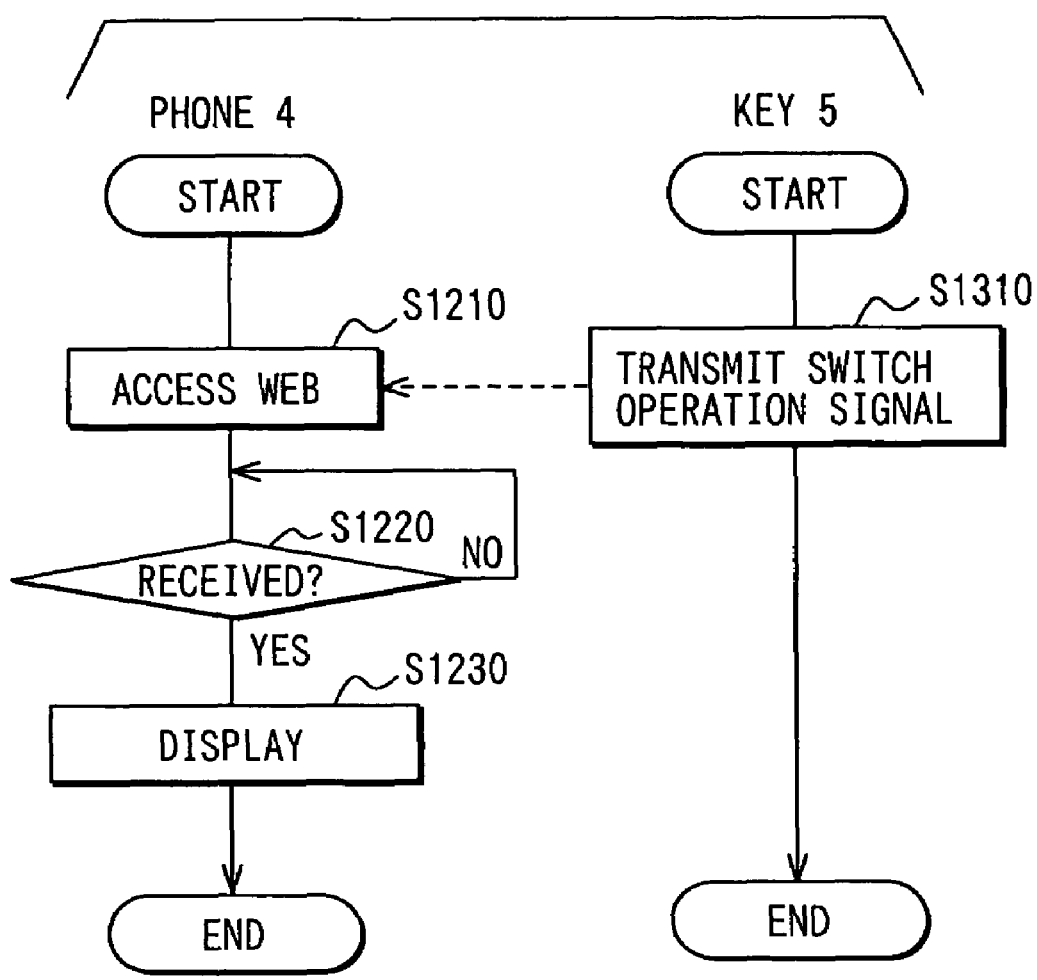

REMOTE MONITORING SYSTEM AND METHOD

CROSS REFERENCE TO RELATED APPLICATION

This application is based on and incorporates herein by reference Japanese Patent Application No. 2004-168778 filed on Jun. 7, 2004.

FIELD OF THE INVENTION

The present invention relates to a remote monitoring system and method for monitoring a monitor object such as a vehicle by remote operations in remote places.

BACKGROUND OF THE INVENTION

In recent years, vehicles are required to enhance security performance for preventing vehicle theft and dragging.

As a system for enhancing security performance, a vehicle remote monitoring system is proposed to monitor a present position and states of a vehicle, locks and unlocks doors, starts up an engine and performs other operations in remote places by using a cellular phone (e.g., a car communication system by use of portable mail function (i-mobisses), [on-line], updated: Apr. 16, 2004, Apex Communications Co., Ltd., (searched May 10, 2004).

Specifically, various items including monitor items such as "vehicle present position confirmation," "vehicle state confirmation," and "map viewing," and operation items such as "door lock/unlock," and "engine remote startup" are listed on a display screen of a cellular phone, and the user selects desired items from them to transmit mail.

When the selected items are monitor items, information of the specified items is received as mail in a user's cellular phone. By browsing it, the user can obtain the information. When the selected item is an operation item, a specified operation (e.g., engine startup) is performed in the vehicle. Mail indicating that the operation has terminated is received in the cellular phone.

In the above vehicle remote monitoring system, however, monitor items selectable by the user are only listed. Therefore, for example, when a present position of a vehicle and a map in the vicinity of the present position are to be obtained at the same time, first by selecting "vehicle present position confirmation" and transmitting mail, a present position information of the vehicle is obtained. Then, by selecting "map viewing" and transmitting mail, detailed map data in the vicinity of the vehicle present position is obtained. In this way, an operation must be performed for each of the items to be monitored.

Thus from among plural listed monitor items, each of the items the user desires at that time must be selected and mail must be transmitted. As the number of the items to be monitored (items to be selected from a list) increases, the number of the user's operations will increase.

Therefore, the monitor method in the above vehicle remote monitoring system lacks user's operability and is very difficult to use particularly to aged or other users unfamiliar with cellular phones. The above system has been difficult for application to a wide range of users.

SUMMARY OF THE INVENTION

The present invention has an object to enhance user's convenience in a remote monitoring system and method.

In a remote monitoring system and method according to the present invention, at least one of switch units is associated with plural pieces of vehicle information, and upon receiving a request signal corresponding to a switch unit associated with plural pieces of vehicle information, a vehicle information communication device obtains the plural pieces of vehicle information and wirelessly transmits them to a communication terminal.

As the vehicle information, there are all possible pieces of information on the vehicle and its surroundings such as door open/closed state, window open/closed state, lock state, parking position, indoor and outdoor temperatures, and interior image. As methods of outputting vehicle information in communication terminals, there are various methods that enable users to obtain vehicle information, such as a method of displaying on a display unit such as a liquid crystal display screen, an output method by voice, and a method of printing on paper.

As an example of associating plural pieces of vehicle information with one switch unit, when one switch unit is to be used as a departure-time switch unit, that is, a switch unit for obtaining necessary vehicle information when a user is going out in the vehicle, by associating a parking position and room temperature of various vehicle information with the switch unit, the user can obtain the two pieces of vehicle information at the same time by operating the switch unit.

When one switch unit is to be used as a return-time switch unit, that is, a switch unit for obtaining necessary vehicle information after a user gets off the vehicle and comes home, the user may associate a lock state and window open/closed state of various pieces of vehicle information with the switch unit. Furthermore, as a switch for confirming all information for obtaining all confirmable vehicle information, all vehicle information may be associated.

The above methods of using the switch units are only examples. It may be decided as required with which switch units what vehicle information is to be associated.

Therefore, according to the vehicle remote monitoring system constructed as above, since the user can collectively obtain desired vehicle information at a given situation (time, user's behavior situation, etc.), that is, necessary and sufficient vehicle information at that time simply by operating one switch unit, a vehicle remote monitoring system convenient for the user can be provided.

The switch units may take various forms as long as the user can operate to obtain desired vehicle information. For example, the switch units may be displayed on a liquid crystal display screen as soft switches to transmit request signal when externally touched on the screen or operated (selection of the switch units) within the screen.

In the case of soft switches, when they are always displayed, the user can immediately select a desired switch unit at desired timing and obtain vehicle information corresponding to it. However, when the switch units are not displayed when the user wants to obtain vehicle information, the user must display the switch units before selecting a desired switch unit.

Accordingly, the switch units may be those constructed by mechanical switches. According to this construction, since the user has only to operate a switch unit (e.g., presses a push-button switch) constructed as a mechanical switch to transmit a request signal so that corresponding vehicle information can be obtained, user's convenience can be further enhanced.

When the correspondence between the switch units and vehicle information is set in advance (e.g., at the time of vehicle manufacturing) and cannot be changed, some users may require not all vehicle information associated with the switch units. Specifically, some users may require other information (e.g., rainfall state. etc.) rather than "room temperature" as vehicle information obtained when the departure-time switch unit is operated.

Accordingly, the correspondence between the switch units and vehicle information may be freely set by the user for each of the switch units. By doing so, since individual users can obtain vehicle information necessary and useful to the users, user's convenience can be further enhanced.

Preferably, the communication terminal comprises an operation device and a transceiver. A device (operation device) including the switch units, and a device (transceiver) that actually performs communications with the vehicle are separately configured.

By thus configuring the communication terminal, functions of the transceiver are included in existing communication devices such as known cellular phones having communication functions and display functions, and functions of the above operation device can be included in portable operation devices used in a known keyless entry system that can remotely operate the door lock mechanism of the vehicle.

Communications between the communication terminal and the vehicle may be made directly. In this case, request signals are wirelessly transmitted from the communication terminal. However, depending on the distance between a user having the communication terminal and the vehicle, or communication specifications, direct communications between them may be difficult. Accordingly, communications between them may be performed via a relay device.

According to this construction, even when the communication terminal and the vehicle information communication device cannot perform communications directly because of a difference between communication protocols or communication distance, a relay device may be used to acquire vehicle information through relaying. Since communications between the communication terminal and the relay device may be made not only wirelessly but also by wires, request signals can be transmitted by accessing the relay device through the Internet from a personal computer, for example. Thus, the communication terminal can be constructed in various forms.

Preferably, regardless of operations on the switch units, the relay device inquires the user (an inquiry about whether vehicle information is required) when a preset time passes. By responding to this inquiry, corresponding vehicle information can be obtained.

According to the vehicle remote monitoring system thus constructed, since the user can obtain vehicle information without fail at a preset time by evocation from the relay device, a more convenient vehicle remote monitoring system can be provided.

On the other hand, unlike the above system in which an inquiry signal is transmitted to the communication terminal and vehicle information cannot be obtained without responding to it, for example, vehicle information may be transmitted at a preset time.

Various methods are possibly used. For example, the vehicle has a timer or other units, and when a preset time passes, the vehicle information communication device obtains and transmits vehicle information corresponding to the time. In short, when the preset time passes, the vehicle information communication device automatically operates to transmit vehicle information.

Conversely, the communication terminal has a timer. When a preset time passes, may transmit a request signal for obtaining vehicle information corresponding to the time. In this case, upon receiving the request signal, the vehicle information communication device obtains and transmits vehicle information based on the request signal. The transmitted vehicle information is received and outputted by the communication terminal.

When a relay device is provided, it has a timer. When a preset time passes, may transmit a request signal (relay request signal) for obtaining vehicle information corresponding to the time to the vehicle. In this case, upon receiving the relay request signal, the vehicle information communication device obtains vehicle information based on the relay request signal and transmits it to the relay device. The transmitted vehicle information is relayed by the relay device, and thereby received and outputted in the communication terminal.

The vehicle information corresponding to the preset time may be associated with any of the switch units. By doing so, even when the user does not operate the switch unit, the system operates as if the switch unit was operated at the preset time, and the user can obtain vehicle information.

BRIEF DESCRIPTION OF THE DRAWINGS

The above and other objects, features and advantages of the present invention will become more apparent from the following detailed description made with reference to the accompanying drawings. In the drawings:

FIG. 1 is a schematic diagram showing a remote monitoring system according to an embodiment of the present invention;

FIG. 2 is a block diagram showing a cellular phone and a smart key shown in FIG. 1;

FIG. 12 is a flowchart showing processing of the smart key and the cellular phone when the smart key is operated to request monitor information in the remote monitoring system.

Figure 3:
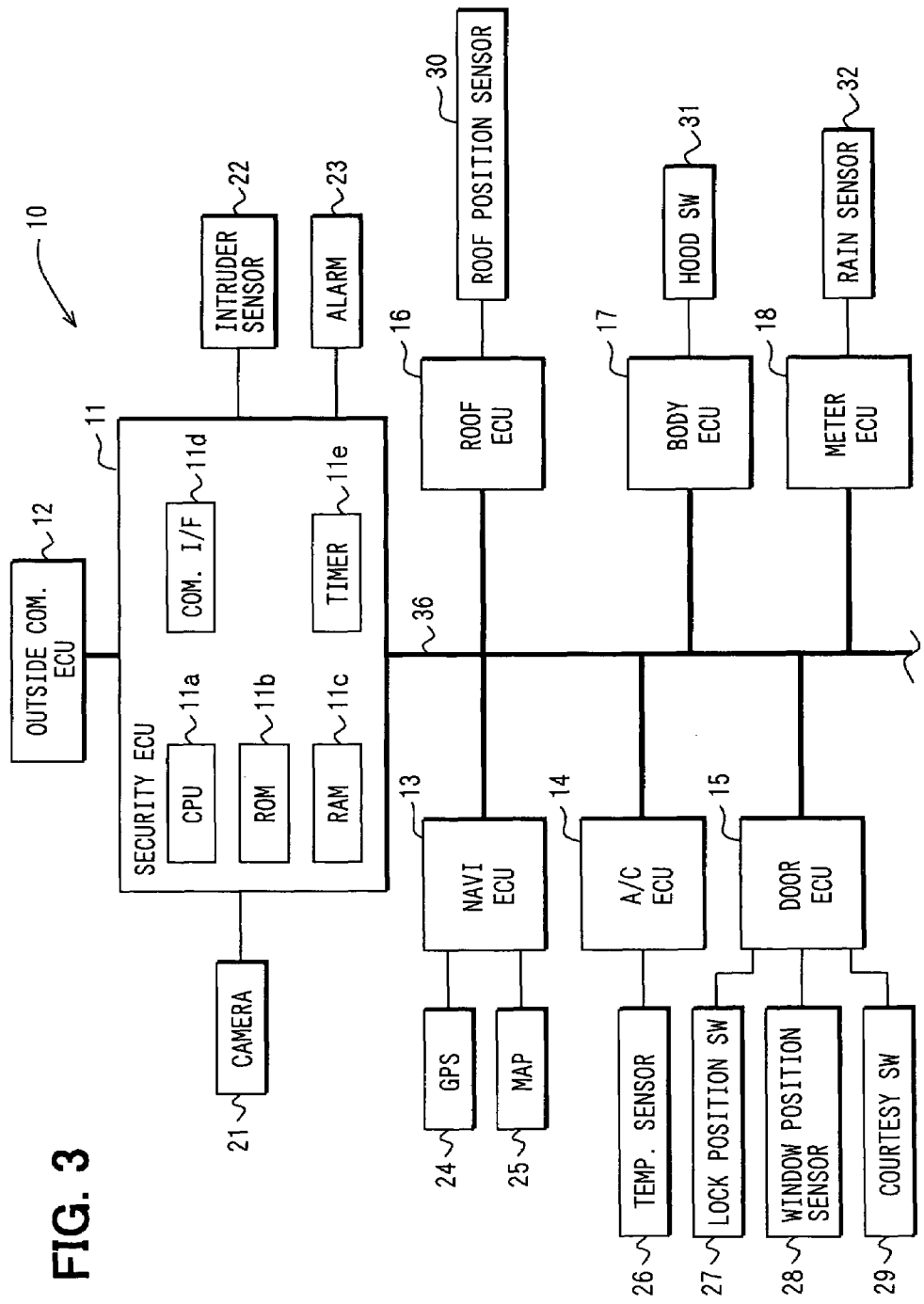
FIG. 3 is a block diagram showing a vehicle information communication device shown in FIG. 1.

DETAILED DESCRIPTION OF THE
PREFERRED EMBODIMENTS

Referring to FIG. 1, a remote monitoring system is constructed as a remote security system, which includes a vehicle information communication device 10 mounted in a vehicle 1, a cellular phone 4, a smart key 5, and an information center (server) 7. The phone 4 and the key 5 are carried by a vehicle owner or user.

The cellular phone 4 is a known portable telephone. It has basic functions for voice conversation with other telephones over a telephone line, functions for transmitting and receiving electronic mail, a function for connecting to the Internet, and a Web browsing function. It further has a remote monitoring function that obtains and displays various pieces of information (monitor information) about states of the vehicle 1 and its surroundings by performing specified communications with the information center 7 upon receiving a specified operation signal from the smart key 5, or when the cellular phone 4 itself is operated. It also has a mail-based remote monitoring function that receives mail making an inquiry about whether to perform remote monitoring, transmitted from the information center 7 at specified time, and can obtain proper vehicle information by replying to the mail. Monitor information is vehicle information.

The smart key 5 is portable, compact equipment for realizing a smart entry system and a keyless entry system. In the smart entry system, when approaching the vehicle 1, a user having the smart key 5 has only to touch a door outside handle (not shown) or operate a trunk open switch (not shown) to unlock the door or open the trunk. In the keyless entry system, the user can lock and unlock a door (not shown) at positions distant from the vehicle 1.

Furthermore, the smart key 5 allows states of the vehicle 1 to be remotely monitored by operating monitor switches provided in the smart key 5. Specifically, by operating the monitor switches, the remote monitoring function of the cellular phone 4 is actuated, and finally, monitor information corresponding to the operated monitor switches is displayed in the cellular phone 4.

As shown in FIG. 2, the smart key 5 includes switches (SW) 51, 52 and 53 for realizing the keyless entry system, and three switches 54, 55 and 56 for realizing the remote monitoring function. Any of these switches 51 to 56 is a push-button switch. When the user operates presses the switches by pressing, processing corresponding to the operated switches is performed in the control part 59.

Of the three switches 51, 52 and 53 for realizing the keyless entry system, the door lock switches 51, 52 and 53 command locking of the door, unlocking of the door and opening of the trunk, respectively, when operated manually by the user.

The three monitor switches 54, 55 and 56 for realizing the remote monitoring function are a departure-time monitor switch 54, a return-time monitor switch 55 and an all item monitor switch 56, respectively. These switches 54, 55 and 56 are respectively associated with predetermined monitor information.

Monitor information that can be monitored in the remote security system includes the following information (1) to (8).
(1) Security set/unset state
(2) Door/trunk/hood open/closed state
(3) Window/roof open/closed state
(4) Door lock state
(5) Interior image
(6) Parking position
(7) Rainfall state
(8) Indoor and outdoor temperatures As security set/unset state (1), set (activate) state of the security function in the vehicle 1 is indicated. The vehicle 1 is provided with an anti-theft (security) function for detecting and alarming an unauthorized intruder from outside the vehicle. The user can make this function set or unset by a specified switch provided inside the vehicle 1.

As door/trunk/hood open/closed state (2), whether doors, trunk, and hood (engine hood) of the vehicle 1 are open or closed is indicated. As window/roof open/closed state (3), whether windows and roof (roof window) of the vehicle 1 are open or closed is indicated. As door lock state (4), whether doors of the vehicle 1 are locked or unlocked is indicated. As an interior image (5), an image photographed by a camera 21 (FIG. 3) mounted in the interior of the vehicle 1 is indicated. As a parking position (6), a present position of the vehicle 1 is indicated by, e.g., an address or a latitude and longitude. As rainfall state (7), the presence or amount of rainfall in the vicinity of the vehicle 1 is indicated. As indoor and outdoor temperatures (8), indoor and outdoor temperatures of the vehicle 1 are indicated.

Of the monitor switches 54, 55 and 56 included in the smart key 5, the departure-time monitor switch 54 is associated with, e.g., parking position, "indoor and outdoor temperatures" and "rainfall state," which are monitor information required or useful when the user is going out in the vehicle 1. Therefore, when the user operates the departure-time monitor switch 54, an operation signal corresponding to it is wirelessly transmitted to the cellular phone 4. As a result, the above three pieces of monitor information (6) to (8) will be finally displayed in the cellular phone 4.

The return-time monitor switch 55 is associated with, e.g., security set/unset state, door/trunk/hood open/closed state, window/roof open/closed state and door lock state which are monitor information probably required after the user gets off the vehicle 1 and comes home. Therefore, when the user operates the return-time monitor switch 55, an operation signal corresponding to it is wirelessly transmitted to the cellular phone 4. As a result, the mentioned four pieces of monitor information (1) to (4) will be finally displayed in the cellular phone 4.

The all item monitor switch 56 is a switch used to collectively obtain all of the pieces of monitor information (1) to (8). Therefore, when the user operates the all item monitor switch 56, an operation signal corresponding to it is wirelessly transmitted to the cellular phone 4. As a result, all of the pieces of monitor information (1) to (8) will be finally displayed in the cellular phone 4.

The user can freely change the setting of the monitor information associated with the monitor switches 54 to 56, and correspondingly can change the names of the switches 54 to 56. For example, when the user wants to obtain an interior image when operating the return-time monitor switch 55, the return-time monitor switch 55 can be additionally associated with interior image. Conversely, unnecessary monitor information can be removed.

Also, for example, when the user wants to change to settings (associations) more desirable to the user without having to monitor all items at a time, the user may freely change monitor information associated with the all item monitor switch 56 to obtain necessary and useful monitor information as desired by the user.

The smart key 5 further includes an input processing part 57, a radio communication part 58, a control part 59 and a memory 60. The input processing part 57 processes and captures input signals from the switches 51 to 56. The radio communication part 58 wirelessly transmits information about user's operations on the switches 51 to 56 through an antenna 61. The control part 59, which includes a microcomputer, determines the type of a user-operated switch from an input signal inputted through the input processing part 57, generates an operation signal added with information such as identification code of a relevant smart key 5 to switch information representative of the type of the switch, and transmits the generated operation signal from the radio communication part 58. The memory part 60 stores operation programs of the control part 59 and the like.

Figure 4:
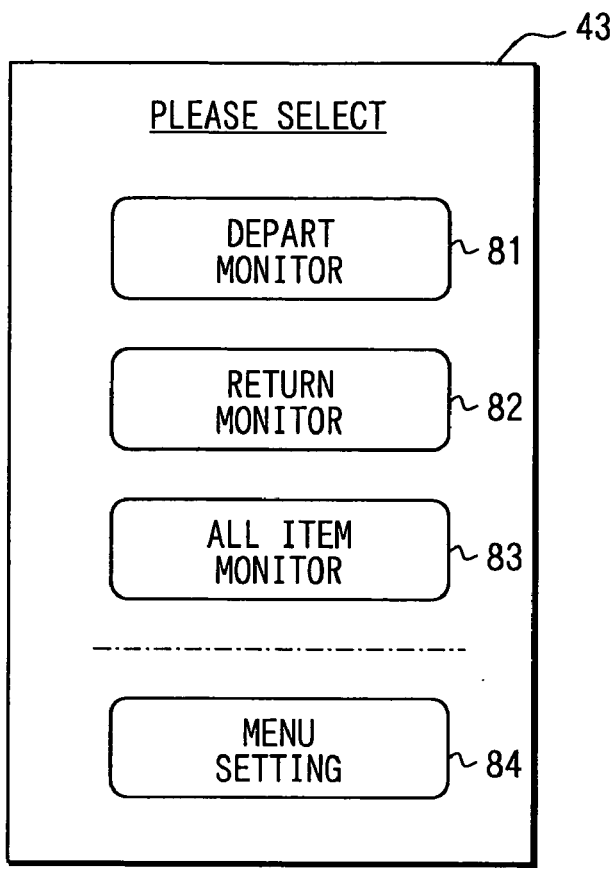
FIG. 4 is a schematic view showing an initial selection screen.
Figure 5:
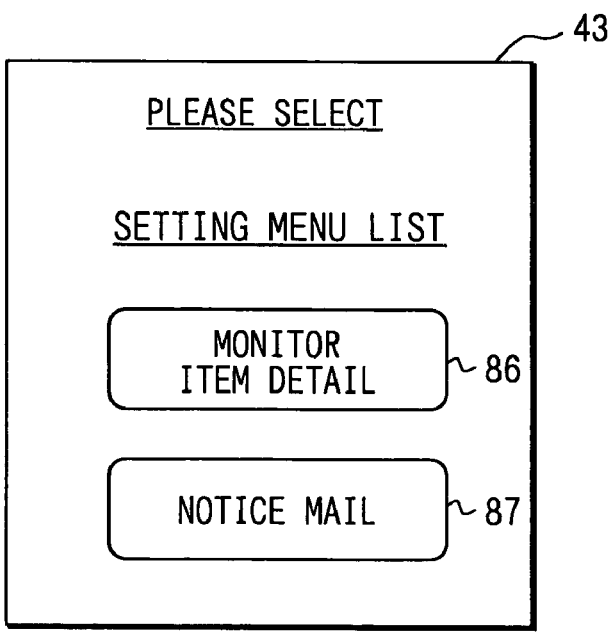
FIG. 5 is a schematic view showing a display screen of a setting menu list.

The cellular phone 4 includes a CPU 41, a radio communication part 42, a display part 43, an operation key 44, a ROM 45 and a RAM 46. The CPU 41 performs various control processing. The radio communication part 42 receives an operation signal from the smart key 5 and transmits a request signal to the information center 7 through the antenna 48, and receives monitor information transmitted through the information center 7 from the vehicle information communication device 10. The display part 43 displays various pieces of information such as monitor information, an initial selection screen (FIG. 4), and a setting menu list (FIG. 5). The operation key 44 is operated for input by the user. The ROM 45 stores various programs executed by the CPU 41 and various data and parameters. The RAM 46 is used as a storage area during control processing by the CPU 41. These components are connected through the bus 47.

The display part 43 includes a liquid crystal display and the like, and the operation key 44 includes push-buttons, and a pointing device operated by the user to vertically and horizontally move a pointer displayed on the liquid crystal display. Although not shown, the cellular phone 4 includes a voice input unit such as a microphone and a voice output unit such as a loudspeaker.

The cellular phone 4 thus constructed enables calls, transmission/reception of electronic mails, and access to the Internet by the user's operation on the operation key 44.

Additionally, the cellular phone 4 has the above remote monitoring function; when any of the three monitor switches (departure-time monitor switch 54, return-time monitor switch 55 and all item monitor switch 56) included in the smart key 5 is operated, the cellular phone 4, upon receiving an operation signal corresponding to the operated monitor switch transmitted from a relevant smart key 5, performs various processing for requesting monitor information corresponding to the operation signal, that is, monitor information associated with a monitor switch corresponding to the operation signal.

Specifically, upon receiving an operation signal from the smart key 5, the cellular phone 4 automatically accesses a specified Web site for realizing a remote security system in a server within the information center 7, then performs specified communication, finally obtains monitor information corresponding to the operation signal from the information center 7 and displays it in the display part.

Furthermore, the cellular phone 4 requests monitor information from the information center 7 by performing specified operations by the operation key 44 without operating the smart key 5 and displays monitor information transmitted from the information center 7 in response in the display part 43.

Specifically, by the user's specified operations, the initial selection screen (FIG. 4) in the remote monitoring function is displayed in the display part 43. As shown in FIG. 4, items that can be monitored are not listed but three types of monitor buttons 81, 82 and 83 (software switches displayed on the liquid crystal display) for selecting a monitor information group to be obtained are displayed. The buttons 81, 82 and 83 are respectively associated with the same monitor information as the monitor switches 54, 55 and 56 of the smart key 5.

That is, the departure-time monitor button 81 in the initial selection screen is associated with parking position (6), rainfall state (7), and indoor and outdoor temperatures (8), like the departure-time monitor switch 54 of the smart key 5. Therefore, when the user operates the departure-time monitor button 81 (for example, in the display part 43, moves the pointer onto the button 81 for determination), a request signal corresponding to it is transmitted to the information center 7. As a result, finally, the above three pieces of monitor information (6) to (8) will be displayed in the cellular phone 4.

The return-time monitor button 82 is associated with security set/unset state (1), door/trunk/hood open/closed state (2), window/roof open/closed state (3), and door unlock state (4), like the return-time monitor switch 55 of the smart key 5. Therefore, when the user operates the return-time monitor button 82, a request signal corresponding to it is transmitted to the information center 7. As a result, finally, the above four pieces of monitor information (1) to (4) will be displayed in the cellular phone 4.

The all item monitor button 83 is associated with all of the above pieces of monitor information (1) to (8), like the all item monitor switch 56 of the smart key 5. Therefore, when the user operates the all item monitor button 83, a request signal corresponding to it is transmitted to the information center 7. As a result, finally, all pieces of monitor information (1) to (8) will be displayed in the cellular phone 4.

When the monitor switches 54, 55 and 56 of the smart key 5 are operated, the cellular phone 4 operates as follows. When an operation signal is transmitted and received in the cellular phone 4 as a result of operating one of the monitor switches 54 to 56 in the smart key 5, the cellular phone 4 determines which switch of the smart key 5 has been operated from the operation signal.

Based on the determination result, the cellular phone 4 requests monitor information associated with one of the monitor buttons 81 to 83 of the cellular phone 4 from the information center 7. Therefore, for example, when an operation signal indicating an operation performed on the departure-time monitor switch 54 in the smart key 5 is inputted, the cellular phone 4 performs various processings such as request signal transmission to request monitor information (monitor information corresponding to the departure-time monitor switch 54) corresponding to the departure-time monitor button 81 in the cellular phone 4.

Therefore, the correspondence between the monitor switches 54 to 56 in the smart key 5 and the monitor information is changed by changing the correspondence between the monitor buttons 81 to 83 in the cellular phone 4 and the monitor information.

Furthermore, in the remote security system, when a preset time passes, mail making an inquiry about whether to acquire monitor information (notice mail) is transmitted from the information center 7 to the cellular phone 4. Upon receiving the notice mail, the cellular phone 4 displays a message making an inquiry about whether to perform monitoring in the display part 43, and displays "Yes" and "No" buttons for a response from the user.

When the user selects "Yes" by operating the operation key 44, various processing (response to the information center 7) for requesting monitor information are performed. As a result, monitor information at the preset time is displayed in the display part 43.

Specifically, even when the user does not operate the smart key 5 and the cellular phone 4 of his own will, notice mail arrives from the information center 7 when the preset time passes, and desired monitor information can be obtained simply by responding to it. The setting of monitor information obtained at preset can be freely changed by the user. For example, setting may be made so that the same monitor information as when the departure-time monitor switch 54 (81), the return-time monitor switch 55 (82), and the all item monitor switch 56 (83) are operated is obtained. Also, for example, monitor information necessary to the user at the preset time may be freely set.

Setting change of the notice mail, and setting change of the correspondence between the monitor buttons 81 to 83 and monitor information can be performed by the user's communications with the information center 7 through operations on the cellular phone 4.

That is, when the menu setting button 84 is operated on the initial selection screen of FIG. 4, the setting menu list shown in FIG. 5 is displayed. Accordingly, when the correspondence between the monitor buttons 81 to 83 and monitor information is to be changed, the monitor item setting screen shown in FIG. 6 is displayed by operating the monitor item detail setting button 86.

Figure 6:
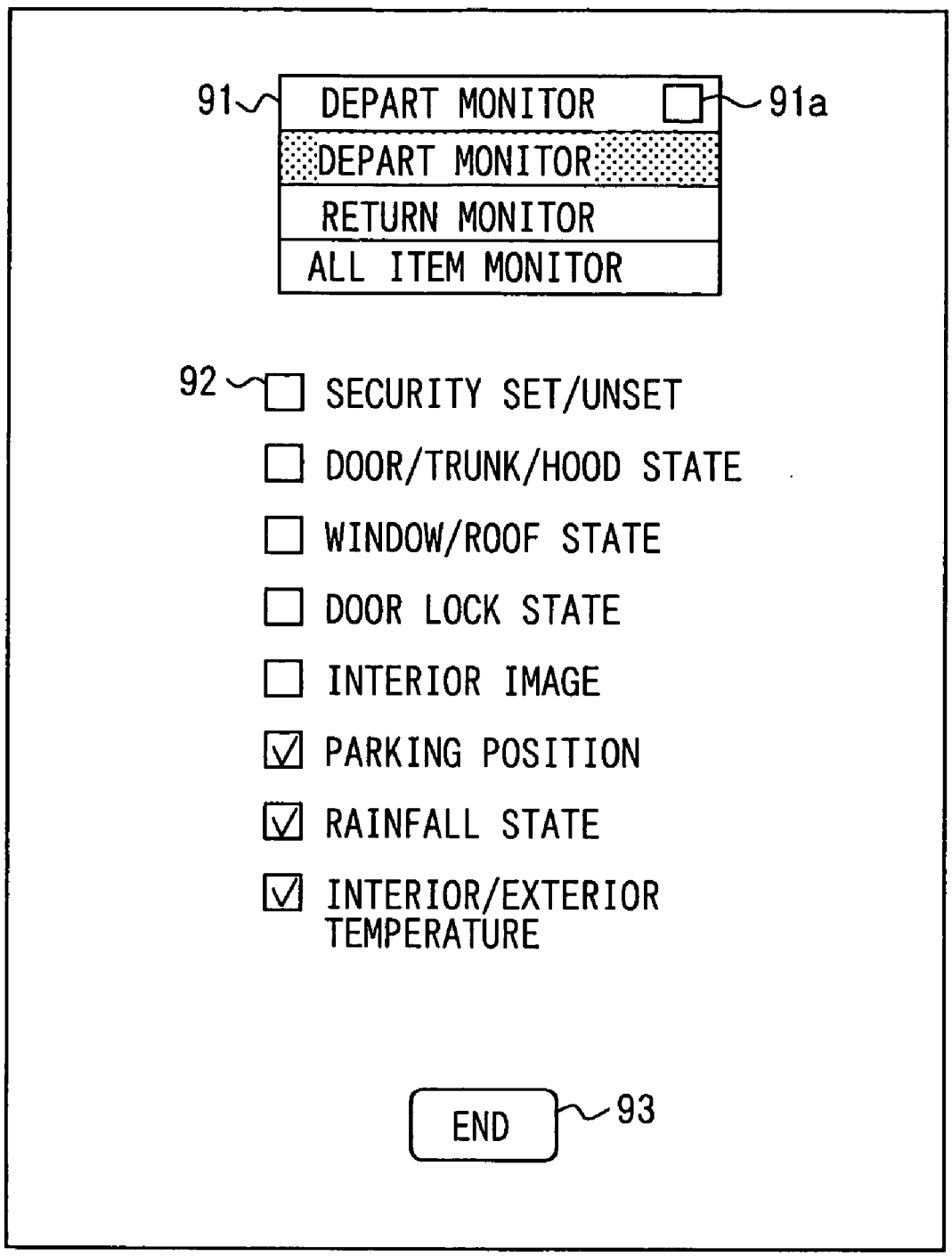
FIG. 6 is a schematic view showing a monitor item setting screen.

In FIG. 6, a monitor button (monitor switch) on which setting is to be performed is selected from a list box 91. When a list display button 91a in the list box 91 is operated (clicking or the like), three types of menus (departure-time monitor, return-time monitor, and all item monitor) indicative of the monitor buttons 81 to 83 are displayed.

Below the list box 91, monitor item names indicative of monitor information obtainable from the vehicle 1 in the remote security system are listed, and a checkbox 92 is provided for each monitor item. The checkbox 92 is known as an operation part in GUI (graphical user interface).

When the user selects any one from the list box 91, only for monitor information (monitor items) associated with it, checkmarks are displayed in the check boxes 92. FIG. 6 shows a case, in which departure-time monitor is selected in the list box 91 and checkmarks are displayed in the check boxes 92 of parking position, rainfall state, and indoor and outdoor temperatures, which are associated with the departure-time monitor button 81 (departure-time monitor switch 54). The user can freely change settings by appending or removing checkmarks to or from the check boxes 92 of the displayed monitor items. When the user terminates setting change and operates an end button 93, the changed setting contents are validated. Thereafter, when the departure-time monitor button 81 (or the departure-time monitor switch 54) is operated, monitor information based on the changed setting contents will be obtained.

The same is also true for other return-time monitor and all item monitor. The names of the monitor menus (departure-time monitor, return-time monitor, all item monitor) may be changed. In that case, changed names will be displayed in the initial selection screen shown in FIG. 4.

Figure 7:
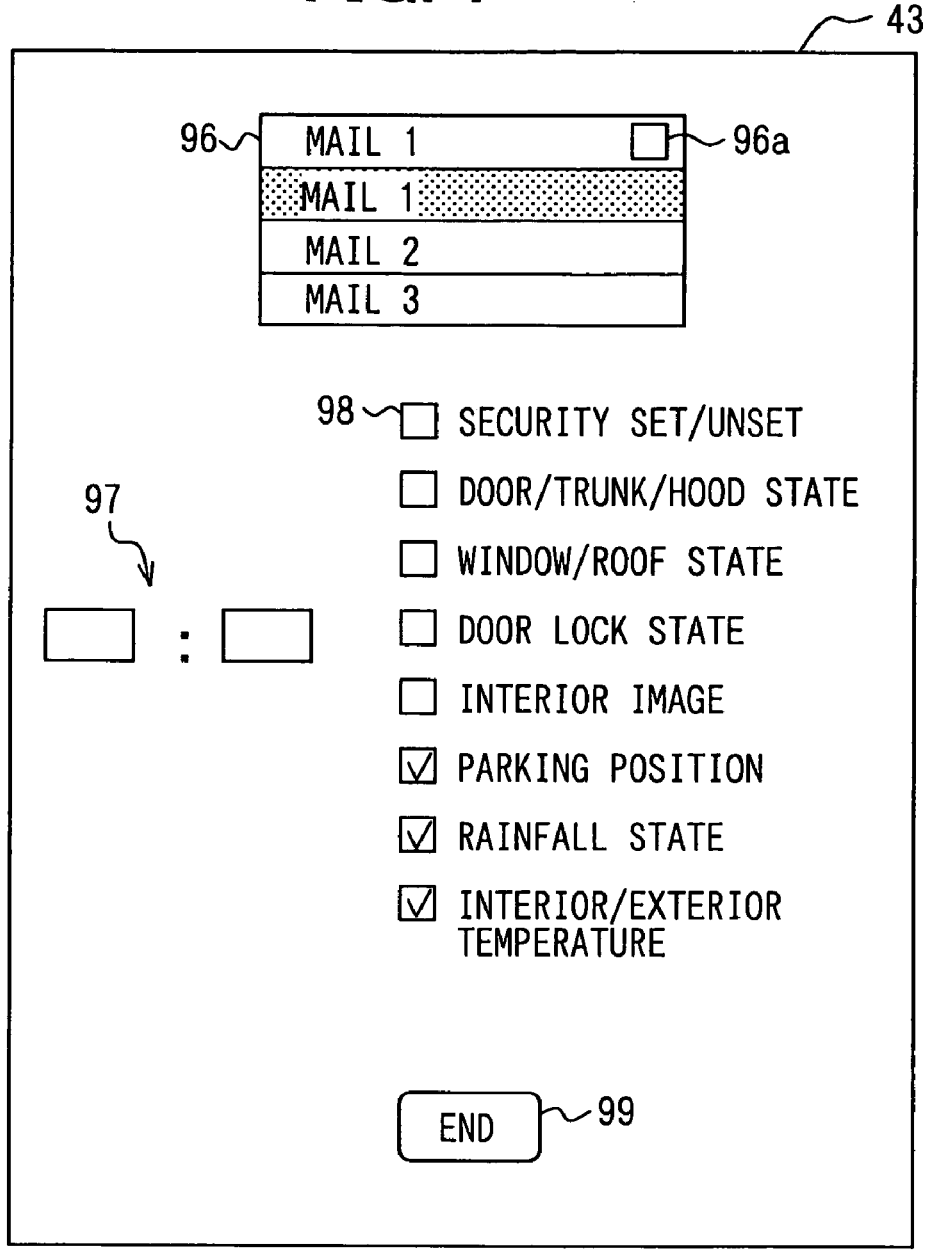
FIG. 7 is a schematic view showing a mail setting screen.

On the other hand, when the setting of notice mail is to be changed, by operating a notice mail setting button 87 in the setting menu list of FIG. 5, a mail setting screen shown in FIG. 7 is displayed. In this embodiment, three types of notice mail from mail 1 to mail 3 can be individually set.

In FIG. 7, mail on which setting is to be performed is selected from a list box 96. When a list display button 96a in the list box 96 is operated (clicking or the like), three types of menus (mail 1, mail 2, mail 3) are displayed. Below the list box 96, like FIG. 6, monitor item names that can be monitored are listed, and a checkbox 98 is provided for each monitor item.

When the user selects any one from the list box 96, only for monitor information (monitor items) associated with it, checkmarks are displayed in the checkboxes 98. FIG. 7 shows a case, in which mail 1 is selected in the list box 96 and checkmarks are displayed in the check boxes 98 of parking position, rainfall state and indoor and outdoor temperatures, which are associated with the mail 1.

On the mail setting screen, a time input field 97 for setting time when notice mail is transmitted from the information center 7 is displayed. Therefore, the user enters a desirable notice mail transmission time to the time input field 97. Like the case of FIG. 6, when the user terminates setting change and operates the end button 99, the changed setting contents are validated. Thereafter, when the time inputted to the time input field 94 is reached, notice mail is transmitted from the information center 7, and a message "Do you perform monitoring?" is displayed in the cellular phone 4. When the user responds to the message, monitor information selected (check the check box 98) in the mail setting screen of FIG. 7 is obtained.

The same is also true for other mail such as mail 2 and mail 3. That is, three different times may be set so that notice mail is transmitted at the times to obtain different monitor information at each time. The vehicle information communication device 10 obtains monitor information from the vehicle 1 and transmits it to the information center 7 (finally transmitted to the user's cellular phone 4).

As shown in FIG. 3, the vehicle information communication device 10 includes a remote security ECU 11, an outside communication ECU 12, a navigation ECU 13, an air-conditioning ECU 14, a door ECU 15, a roof ECU 16, a body ECU 17 and a meter ECU 18. These ECUs 11 to 18 are connected by an in-vehicle LAN 36.

The outside communication ECU 12 receives a monitor information request signal from the information center 7 and outputs it to the remote security ECU 11, and wirelessly transmits monitor information from the remote security ECU 11 to the information center 7.

The navigation ECU 13, which is used to realize a navigation system in the vehicle 1, obtains GPS data through a GPS receiver 24 and locates a present position based on the data. It superimposes the located present position on map data obtained from a map information recording part 25 to display the result on a display screen (not shown) of the liquid crystal display or the like. Furthermore, when a request to monitor parking position is issued from the information center 7, according to a command from the remote security ECU 11, it locates a present position at the request time and transmits it to the remote security ECU 11. The remote security ECU 11 transmits the received present position data to the information center 7 as monitor information on a parking position.

The air conditioning ECU 14, which controls indoor air conditioning of the vehicle 1, includes an indoor/outdoor temperature sensor 26 for detecting indoor and outdoor temperatures of the vehicle 1 and controls air conditioning based on temperatures detected by the indoor/outdoor temperature sensor 26. Furthermore, when a request to monitor indoor and outdoor temperatures is issued from the information center 7, it detects indoor and outdoor temperatures at the request time and transmits them to the remote security ECU 11 according to a command from the remote security ECU 11. The remote security ECU 11 transmits the received temperature data to the information center 7 as monitor information on indoor and outdoor temperatures.

The door ECU 15 controls the lock mechanism of the vehicle doors and window operation. Although it is actually provided for each of the doors, only one is shown in FIG. 3 for simplicity. The door ECU 15 is supplied with a detection signal from the lock position switch 27 that detects door lock/unlock, a detection signal from a window position sensor 28 that detects window open/closed state (position), and a detection signal from a door curtain switch 29 that detects a door open/closed state. When a request to monitor any of door/trunk/hood open/closed state, window/roof open/closed state or door lock state is issued from the information center 7, it detects the requested states at the request time and transmits them to the remote security ECU 11 according to a command from the remote security ECU 11. The remote security ECU 11 transmits the received data to the information center 7 as one item of requested monitor information pieces.

The roof ECU 16 controls the opening and closing of a roof window (e.g., window of horizontal slide type) provided on the ceiling of the vehicle 1 and is supplied with a detection signal from a roof position sensor 30 that detects open/closed state. When a request to monitor window/roof open/closed state is issued from the information center 7, it detects a roof window open/closed state at the request time and transmits it to the remote security ECU 11 according to a command from the remote security ECU 11. The remote security ECU 11 transmits the received open/closed state data to the information center 7 as one of monitor information on window/roof open/closed state.

The body ECU 17 controls the body of the vehicle 1 and controls various ECUs such as the door ECU 15 and the roof ECU 16. It is also supplied with a detection signal indicative of an engine hood open/closed state sent from a hood open/close switch 31 for opening and closing the engine hood. When a request to monitor door/trunk/food open/closed state is issued from the information center 7, according to a command from the remote security ECU 11, it detects an engine hood open/closed state at the request time and transmits it to the remote security ECU 11. The remote security ECU 11 generates monitor information on door/trunk/food open/closed state based on the received detection signal and transmits it to the information center 7.

The meter ECU 18, which controls parts of the instrument panel (not shown) of the vehicle 1, is supplied with a detection signal from a rain sensor 32 provided in a portion exposed to the outside in the vehicle 1, and detects rainfall in the vicinity of the vehicle 1 based on the detection signal. When a request to monitor rainfall state is issued from the information center 7, it detects rainfall at the request time and transmits it to the remote security ECU 11 according to a command from the remote security ECU 11. The remote security ECU 11 transmits the received rainfall state data to the information center 7 as monitor information on rainfall state.

The remote security ECU 11 performs obtaining various pieces of monitor information in the vehicle 1 in the remote security system, and transmitting it to the information center 7. The remote security ECU 11 includes a CPU 11a that performs various control processing for realizing the remote security system and various control processing for realizing an anti-theft system in the vehicle 1, a ROM 11b in which programs for the CPU 11a to perform various control processing, and the like are stored, a RAM 11c used as a storage area during various control processing by the CPU 11a, a communication interface (communication I/F) 11d through which various data is inputted and outputted to and from the external ECUs 12 to 18, and a timer 11e that outputs information about current time.

The anti-theft system realized by the remote security ECU 11 detects illegal opening of a door by a signal from the door ECU 15, or illegal intrusion of a third party to the vehicle 1 by a signal from an intruder sensor 22. When such an irregularity is detected, an alarm device 23 sounds an alarm to warn the intruder. Whether to activate the anti-theft system can be freely set by the user by a switch (not shown) provided in the interior of the vehicle 1. The remote security ECU 11 keeps track of the setting contents, that is, activation states of the anti-theft system.

A camera 21 is provided in the interior of the vehicle 1. The camera 21 is activated upon receipt of a command from the remote security ECU 11, photographs the interior of the vehicle 1 and transmits the obtained image data to the remote security ECU 11.

The remote security ECU 11 thus constructed, upon receipt of a request for monitor information from the information center 7, for monitor information other than security set/unset and interior image, issues commands to corresponding ECUs to obtain the requested monitor information.

On the other hand, when monitor information on security set/unset is requested, the remote security ECU 11 determines the operating state of the anti-theft system. When it is operating, the ECU 11 determines as an operating state, otherwise, as a security unset state. When interior image is requested, the remote security ECU 11a activates the camera 21 to obtain interior image data.

For requests from the information center 7, the remote security ECU 11 collectively transmits the monitor information obtained from the ECUs, interior image data from the camera 21, or security state determined by itself wirelessly to the information center 7 from the outside communication ECU 12.

The information center 7 relays communications between the cellular phone 4 and the vehicle information communication device 10. Upon receiving a request signal to request monitor information from the cellular phone 4, the information center 7 converts the request signal into a format receivable by the vehicle information communication device 10, and transmits it to the vehicle 1 as a new request signal (relay request signal). Upon receiving monitor information transmitted from the vehicle information communication device 10 in response to the request signal, the information center 7 converts the received monitor information into the format receivable in the cellular phone 4 before transmitting it to the cellular phone 4.

When a preset time passes, the information center 7 transmits the notice mail to the cellular phone 4. When a response signal indicative of monitoring is transmitted from the cellular phone 4 in response to the notice mail, the information center transmits a request signal to obtain monitor information associated with the mail at the time to the vehicle 1.

The remote monitor communication processing performed among the vehicle information communication device 10, the information center 7, and the cellular phone 4 in the remote security system is described in detail with reference to FIG. 8.

The user automatically accesses a specified Web site for realizing the remote security system by operating the cellular phone 4 (S110). When the access is received in the information center 7 (S310: YES), the information center 7 transmits Web data for user verification, that is, Web data indicating a request for user identification code (ID) and password (PW) to the cellular phone 4 (S320).

As a result, a screen for prompting the user to enter an ID and password is displayed in the display part 43 of the cellular phone 4 (S120). When ID and password are entered by the user (S130: YES), the ID and password are transmitted to the information center 7 (S140).

When the ID and password are received in the information center 7 (S330: YES), the information center 7 determines whether they are those of an authorized user. When they are not those of an authorized user (S340: NO), the processing returns to S320 to prompt the user to enter ID and password again. When they are those of an authorized user (S340: YES), the information center 7 transmits the data of the initial selection screen shown in FIG. 4 to the cellular phone 4 (S350).

Upon receiving the data of the initial selection screen (S150: YES), the cellular phone 4 displays the initial selection screen of FIG. 4 in the display part 43 based on the received data (S160). When any of the buttons 81 to 84 on the initial selection screen is operated (selected) by the user (S170: YES), the cellular phone 4 transmits a signal corresponding to the operated button to the information center 7 as an initial selection information signal (S180). At this time, when any of the monitor buttons 81 to 83 is operated, the cellular phone 4 transmits a request signal for requesting monitor information associated with the operated button as an initial selection information signal. When the menu setting button 84 is operated, the cellular phone 4 transmits a signal indicating the setting of monitor items and notice mail as an initial selection information signal.

Upon receiving the initial selection information signal (S360: YES), the information center 7 determines the contents of the received initial selection information signal (S370). It specifically checks whether the received information signal corresponds to monitoring. When it is a signal corresponding to the menu preset button 84 (S370: NO), the processing proceeds to processing in FIG. 9. When it is a request signal to request monitor information (S370: YES), the information center 7 converts the request signal into the format receivable by the vehicle information communication device 10 and transmits it to the vehicle 1 as a new request signal (relay request signal) (S380).

Upon receiving the relay request signal (S410: YES), the remote security ECU 11 of the vehicle information communication device 10 identifies requested monitor information, that is, which of the three monitor buttons 81, 82 and 83 (FIG. 4) in the cellular phone 4 has been operated (S420). When interior image is requested (S420: YES), that is, when the all item monitor button 83 is operated in the cellular phone 4, the vehicle information communication device 10 actuates the camera 21 to photograph an interior image (S440), and receives the photographed image to perform image processing and the like (S450).

When interior image is not requested (S420: NO), or after processing of S450 terminates, the vehicle information communication device 10 obtains (information collection) the requested monitor information from corresponding ECUs (S430). It converts the monitor information obtained in this way (monitor result in FIG. 8) into reply data transmittable to the information center 7 (S460) and wirelessly transmits it to the information center 7 (S470).

Upon receiving monitor information from the vehicle information communication device 10 (S390: YES), the information center transmits the monitor information to the cellular phone 4 (S400).

Upon receiving the monitor information from the information center 7 (S190: YES), the cellular phone 4 determines the received contents (monitor information in this example) (S200). It specifically determines whether the monitor information was received. If YES (S200), it displays the received monitor information in the display part 43 (S210).

Figure 10:
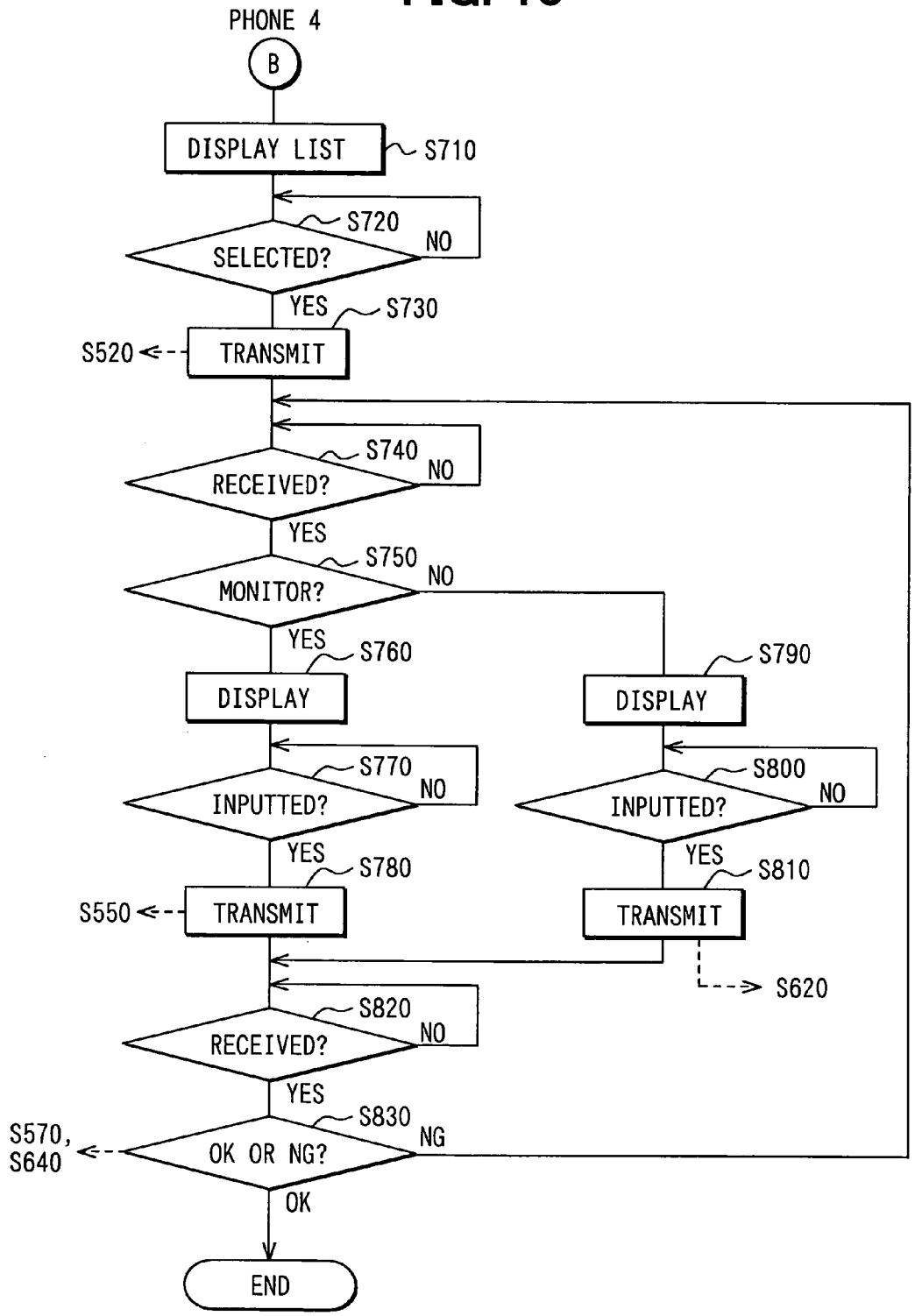
FIG. 10 is a flowchart showing processing performed by the cellular phone when determined as a setting menu list by processing performed in the cellular phone in remote monitor communication processing of FIG. 8.

If the cellular phone 4 determines that the received contents are setting menu list (S200: NO), it proceeds to processing shown in FIG. 10. That is, the cellular phone 4 displays the received setting menu list in the display part 43 (S710). When one of the two buttons 86 and 87 in the setting menu list shown in FIG. 5 is selected by the user (S720: YES), a selection menu signal, which is a signal corresponding to the selected button, is transmitted to the information center 7 (S730).

Figure 9:
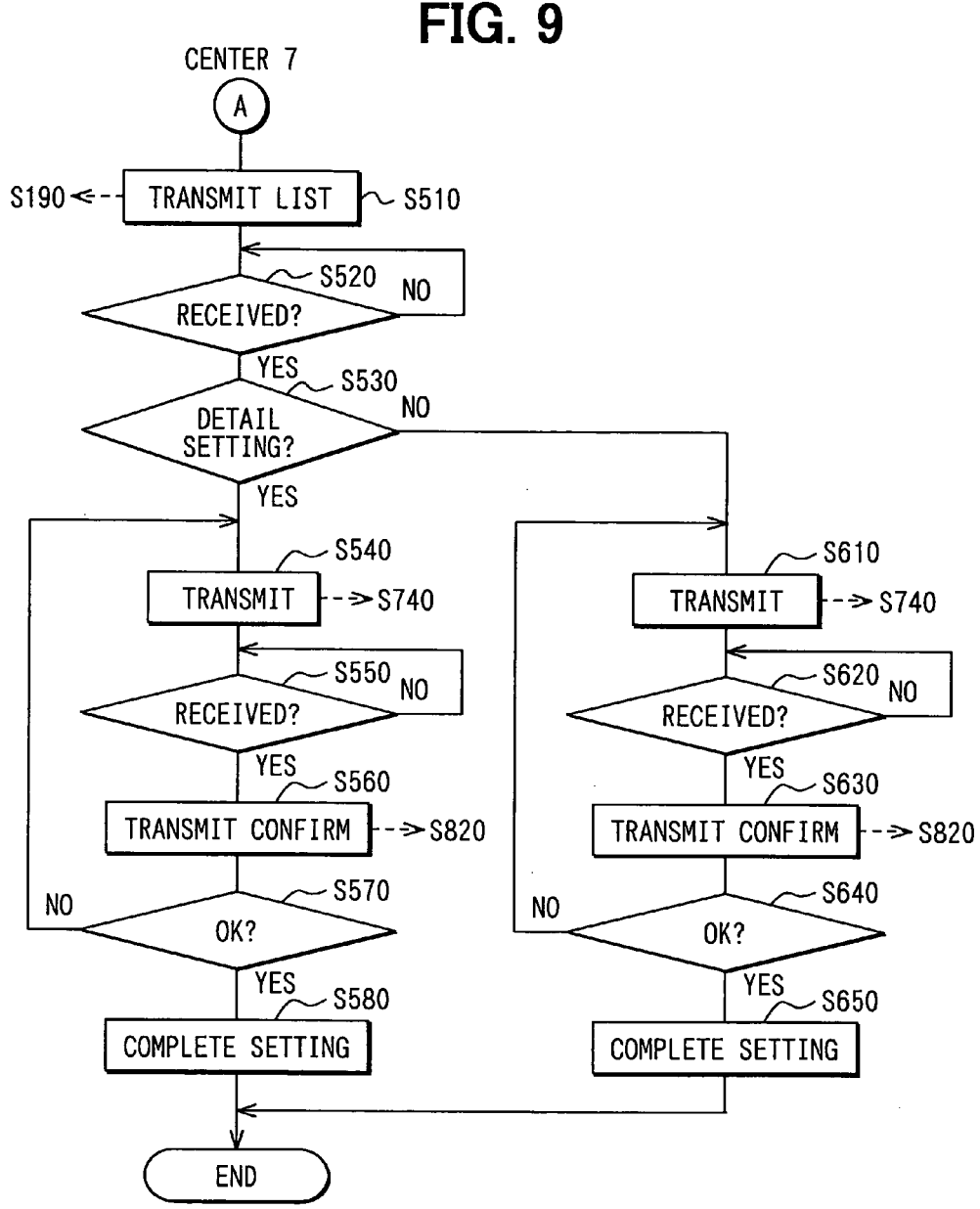
FIG. 9 is a flowchart showing processing performed by an information center when determined as a menu setting by processing performed in the information center in remote monitor communication processing of FIG. 8.

When a signal indicating the setting of monitor items and notice mail is transmitted (S180) from the cellular phone 4 by the user's selection of the menu setting button 84 on the initial selection screen of FIG. 4, the information center 7 determines the contents of the signal (S370), and proceeds to processing shown in FIG. 9. In this case, the information center 7 transmits the screen data of the setting menu list shown in FIG. 5 to the cellular phone 4 (S510).

Upon receiving the selection menu signal (S520: YES), the information center 7 determines user-selected contents from the received signal (S530), and proceeds to S540 when the monitor item detail setting button 86 is selected, and to S610 when the notice mail setting button 87 is selected.

When proceeding to S540 because of the monitor item detail setting, the information center 7 transmits the data of the monitor item setting screen shown in FIG. 6 to the cellular phone 4. Upon receiving the data of the monitor item setting screen (S740: YES), the cellular phone 4 determines the content of the received data (monitor item setting screen data in this example) (S750), and displays the received monitor item setting screen in the display part 43 (S760). Upon completion of user's input and setting for the monitor item setting screen, that is, when the end button 93 has been operated (S770: YES), the cellular phone 4 transmits the setting contents to the information center 7 (S780).

Upon receiving the setting contents from the cellular phone 4 (S550: YES), the information center 7 transmits contents confirmation screen data to have the user confirm the setting contents (S560). On the contents confirmation screen, which is not shown, user-set contents are collectively displayed, and OK (okay) button and NG (not good) button are displayed to ask the user for final determination of the contents.

When the content confirmation screen data is received in the cellular phone 4 (820: YES), the cellular phone 4 waits until the OK button or the NG button is selected by the user. When the NG button is selected, the cellular phone 4 transmits an NG signal indicating it to the information center 7 and returns to processing of S740, and waits that the monitor item setting screen of FIG. 6 is transmitted again. When the OK button is selected, the cellular phone 4 transmits an OK signal indicating it to the information center 7.

Upon receiving the NG or the OK button from the cellular phone 4, the information center 7 determines the content of the signal. When it is an NG signal (5570: NO), the information center 7 transmits the data of the monitor item setting screen to the cellular phone 4 again (S540). When it is an OK signal (S570: YES), the information center 7 determines the setting contents and thereafter places the remote security system into operation according to the setting contents (S580) thereby completing the setting.

On the other hand, when the information center 7 determines from the determination processing of S530 that the notice mail setting button 87 has been selected, and thereby proceeds to S610, it transmits the data of the mail setting screen shown in FIG. 7 to the cellular phone 4. Upon receiving the data of this mail setting screen (S740: YES), the cellular phone 4 determines the contents of the received data (mail setting screen data), and displays the received mail setting screen in the display part 43 (S790). Upon completion of user's input and setting for the mail setting screen, that is, when the end button 99 is operated (S800: YES), the cellular phone 4 transmits the setting contents to the information center 7 (S810).

Upon receiving the setting contents from the cellular phone 4 (S620: YES), the information center 7 transmits contents confirmation screen data to have the user confirm the setting contents (S630). On the contents confirmation screen, which is not shown, like the screen data transmitted in the S560, user-set contents are collectively displayed, and OK button and NG buttons are displayed to ask the user for final determination of the contents.

When the content confirmation screen data is received in the cellular phone 4 (S820: YES), the cellular phone 4 waits until the OK button or the NG button is selected by the user. When the NG button is selected, the cellular phone 4 transmits an NG signal indicating it to the information center 7 and returns to processing of S740, and waits that the mail setting screen of FIG. 7 is transmitted again. When the OK button is selected, the cellular phone 4 transmits an OK signal indicating it to the information center 7.

Upon receiving the NG or the OK signal from the cellular phone 4, the information center 7 determines the content of the signal. When it is an NG signal (S640: NO), transmits the data of the mail setting screen to the cellular phone 4 again (S610). When it is an OK signal (S640: YES), the information center 7 determines the setting contents and thereafter places the remote security system into operation according to the setting contents,(S650).

The operation of the remote security system when notice mail is transmitted from the information center 7 at a time set on the mail setting screen 7 is described with reference to FIG. 11.

When notice mail is transmitted from the information center 7 at a preset time (S910), the cellular phone 4 receives and displays the notice mail (S1010). Notice mail transmission from the information center 7 is caused by timer interrupt at the preset time. The notice mail display processing in the cellular phone 4 is performed by interrupt caused when the notice mail is received.

The cellular phone 4 displays the received notice mail in the display part 43, and waits for input from the user (S1020). At this time, a message "Do you perform monitoring?" and the YES and the NO buttons for having the user make a reply are displayed.

When the user selects the NO button by operating the operation key 44, the cellular phone 4 automatically accesses a specified Web site for realizing the remote security system, and transmits a response signal indicating that monitor information is not required (S1090). The information center 7 receives Web site access from the cellular phone 4 (S920: YES). When the received response signal is a signal indicating that monitor information is not required (monitor execution not required) (S930: NO), performs termination processing (S1000). Specifically, the information center 7 transmits a signal indicating the termination of a series of processing by notice mail to the cellular phone 4. The cellular phone 4 displays the end of a series of processing based on the signal (S1100).

On the other hand, when the user selects the YES button for the notice mail, the cellular phone 4 automatically accesses a specified Web site for realizing the remote security system, and transmits a response signal indicating that monitor information is required (S1030). The information center 7 receives Web site access from the cellular phone 4 (S920: YES). When the received response signal is a signal indicating that monitor information is required (monitor execution required) (S930: YES), it transmits Web data for user verification, that is, Web data indicating a request for user ID and password to the cellular phone 4 (S940).

Figure 8:
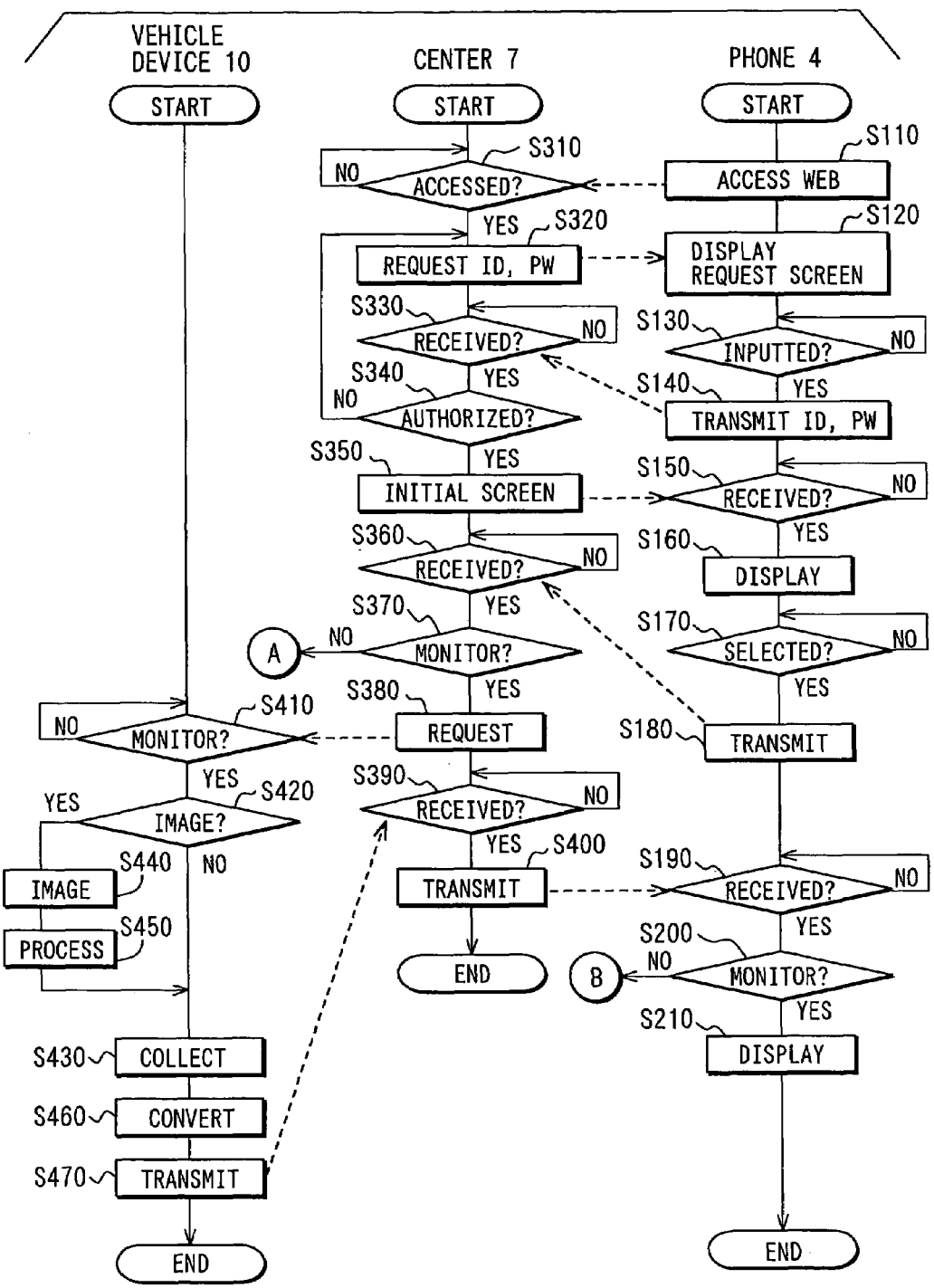
FIG. 8 is a flowchart indicating remote monitor communication processing in the remote monitoring system.

Processing of S940 to S960 in the information center 7 is exactly the same as processing of S320 to S340 in the information center 7 shown in FIG. 8. Processing of S1040 to S1060 in the cellular phone 4 is exactly the same as processing of S120 to S140 of the cellular phone 4 shown in FIG. 8.

When it is determined by the verification in the information center 7 that the user is an authorized user, the information center 7 transmits a request signal to the vehicle information communication device 10 to obtain monitor information associated with the preset time (S970). When monitor information from the vehicle information communication device 10 is received in the information center 7 (S980: YES) in response to the request signal, the information center 7 transmits the monitor information to the cellular phone 4 (S990).

Upon receiving the monitor information of the information center 7 (S1070: YES), the cellular phone 4 displays the received content in the display part 43 (S1080).

The processing described with reference to FIGS. 8 to 11 assumes that monitor information is requested by operating the cellular phone 4. However, monitor information can also be obtained by operating (pressing) the monitor switches 54, 55 and 56 of the smart key 5.

Specifically, as shown in FIG. 12, when the user operates any of the monitor switches 54, 55 and 56 in the smart key 5, an operation signal corresponding to the operated switch is transmitted from the smart key 5 to the cellular phone 4 by interrupt processing for the operation (S1310).

Upon receiving the operation signal, the cellular phone 4 automatically accesses the information center 7 by the reception interrupt. The cellular phone 4 transmits a request signal for requesting monitor information corresponding to the operation signal to the information center 7 together with a user ID and password stored in advance in the cellular phone 4 (S1210).

In the information center 7, of processing shown in FIG. 8, processing in and after S380 are performed. Upon receiving the monitor information from the vehicle, the information center 7 transmits it to the cellular phone 4 (S400 of FIG. 8). Upon receiving the monitor information (S1220: YES), the cellular phone 4 displays the received monitor information in the display part 43 (S1230).

When the user uses the smart key 5 to request monitor information, the user has only to operate any of the monitor switches (the departure-time monitor switch 54, the return-time monitor switch 55, and the all item monitor switch 56) provided in the smart key 5. Thus, communications are automatically established among the cellular phone 4, the information center 7 and the vehicle information communication device 10, and desired monitor information is displayed.

According to the remote security system, simply by operating the monitor switches 54, 55 and 56 provided in the smart key 5 or the monitor buttons 81, 82 and 83 displayed in the display part 43 of the cellular phone 4, plural pieces of vehicle information corresponding to the operated switch (or button) can be collectively obtained. Also, since vehicle information useful for each of user's situations (departure time, return time, etc.) is associated for each switch (or button), the user can collectively obtain necessary and adequate vehicle information according to situations. As a result, a highly convenient remote security system can be provided to the user.

Moreover, the correspondence between the monitor switches 54, 55 and 56 (or the monitor buttons 81, 82 and 83) and monitor information (monitor items) can be freely changed by the user. Therefore, individual users can obtain vehicle information necessary and useful to the users, and users' convenience is further increased.

When monitor information is obtained by operating the monitor buttons 54, 55 and 56 provided in the smart key 5, the user has only to press the monitor buttons. Specified communications are thereby automatically established. As a result, desired monitor information is displayed. Therefore, users' convenience is increased in comparison with the case where only the soft switches (monitor buttons 81, 82 and 83) of the cellular phone 4 are provided.

Furthermore, in this embodiment, as user-operated switches to obtain monitor information, the monitor switches 54, 55 and 56 being mechanical switches are provided in the smart key 5, and the monitor buttons 81, 82 and 83 being soft switches are included in the cellular phone 4. For the smart key 5, the monitor switches 54, 55 and 56 may be only added for existing functions. For the cellular phone 4, hardware changes are little required, and only software changes are required. Therefore, the remote security system can be relatively easily applied by using existing facilities and systems.

Notice mail is transmitted from the information center 7 at every preset time interval, and by responding to the mail, the user can obtain user's desired monitor information at the time without fail. As a result, more convenient remote security system can be provided.

In this embodiment, the smart key 5 is provided as an operation device, the cellular phone 4 is provided as a transceiver, the information center 7 is provided as a transponder, the three monitor switches 54, 55 and 56, and the three monitor buttons 81, 82 and 83 are provided as a switch unit, the operation key 44 is provided as a response input unit, the display part 43 is provided as a vehicle information output unit, the control part 59 is provided as an operation signal transmitting unit, and notice mail transmitted by the information center 7 corresponds to an inquiry signal. An operation signal receiving unit and a vehicle information receiving unit are constituted by the radio communication part 42 and the antenna 48 in the cellular phone 4.

In the processing shown in FIG. 8, the processing of S180 corresponds to processing performed by the request signal transmitting unit. In the processing shown in FIG. 12, processing of S1310 is processing performed by the operation signal transmitting unit.

[Modification]

In the above embodiment, monitor information obtained by responding to notice mail when a preset time passes may be freely set by user's setting on the mail setting screen (FIG. 7). For example, in response to transmitted notice mail of "Do you execute departure-time monitoring?," monitor information associated with the departure-time monitor switch 54 may be obtained. The same is also true for other switches 55 and 56.

By doing so, for example, in the case where a user monitors doors and windows by operating the departure-time monitor switch 55 at 9:00 p.m. every day, when notice mail of "Do you execute departure-time monitoring?" is set to be transmitted at 9:00 p.m. every day, the user will be able to obtain desired monitor information at 9:00 p.m. every day without fail without taking the trouble to operate the departure-time monitor switch 55.

In the embodiment, notice mail is transmitted at a preset time, and monitoring is performed when a positive response is made to the acquisition of monitor information. However, unlike the embodiment, desired monitor information may be transmitted to the user regardless of user's will when a preset time passes.

Specifically, for example, when a preset time passes, the information center 7 transmits a request signal to obtain monitor information to the vehicle information communication device 10. Upon receiving it, the vehicle information communication device 10 obtains specified monitor information and transmits it to the information center 7. The information center 7 relays the monitor information to transmit it to the cellular phone 4.

For example, the remote security ECU 11 forming the vehicle information communication device 10 manages time. When a preset time passes, the remote security ECU 11 may automatically operate, obtain specified monitor information and transmit the monitor information to the information center 7. In this case, when the monitor information is transmitted from the vehicle at the preset time, the information center 7 may relay it for transmission to the cellular phone 4.

Furthermore, for example, the cellular phone 4 may manage time. When a preset time passes, automatically operate and transmit a request signal to the information center 7 to obtain specified monitor information.

By doing so, desired monitor information is obtained at a preset time and transmitted to the cellular phone 4. Since the user can confirm it, user's convenience can be further increased.

In the embodiment, communications between the cellular phone 4 and the vehicle information communication device 10 are performed via the information center 7. However, communications may be performed directly between the cellular phone 4 and the vehicle information communication device 10.

Furthermore, by providing the smart key 5 with functions for communications with the vehicle information communication device 10 and a monitor information output function (display screen, etc.), without using the cellular phone 4, communications may be performed directly or via the information center 7 between the smart key and the vehicle 1.

In the embodiment, eight types of monitor information (1) to (8) are shown as information that can be remotely monitored. However, the eight types are only an example and the number of types of monitor information may be greater or less than eight. For monitor switches (or monitor buttons in the cellular phone 4) in the smart key 5, in the embodiment, three types, that is, departure-time monitor, return-time monitor and all item monitor, are shown. However, this is only an example, and the number of monitor switches may be reduced to two or less, or more monitor switches may be provided so that information useful to the user at given situations may be provided by adding switches (button) as bed-time monitor, door-related information monitor and climate (environment) monitor.

In the embodiment, when the user uses the smart key 5 to request monitor information, ID and password are automatically transmitted to the information center 7 as shown in FIG. 12 so that the user can obtain monitor information by a single operation on the switch. In this case, the ID and password may be inputted by the user.

Figure 11:
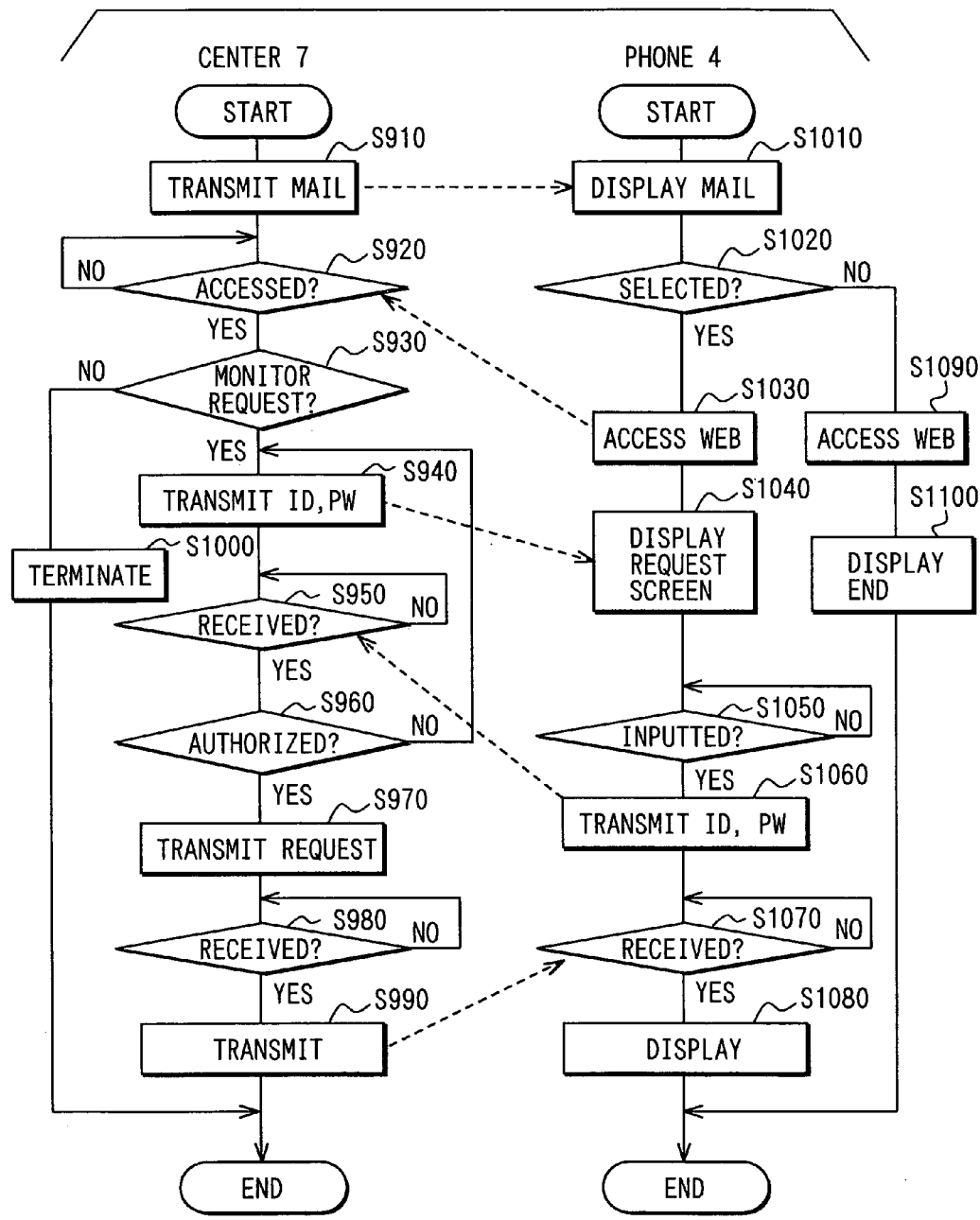
FIG. 11 is a flowchart showing monitor communication processing by notice mail in the remote monitoring system.

Conversely, when the user operates the cellular phone 4 to request monitor information, ID and password are inputted by the user as shown in FIGS. 8 and 11. However, the ID and password may be stored in advance in the cellular phone 4 so that they are automatically transmitted to the information center.

As user operations during requesting of monitor information, in addition to the monitor switches 54, 55 and 56, and the monitor buttons 81, 82 and 83, the user may use voice for selection and indications. Monitor information obtained may be not only displayed in the display part 43 of the cellular phone 4 but also be outputted by voice or printed out by a printing unit newly provided. In short, as long as the user can request desired monitor information and obtain or know the requested monitor information, its operation input methods and monitor information output methods are not limited.

In the monitor item setting screen of FIG. 6 and the mail setting screen of FIG. 7, the list box 91 (96) and the checkbox 92 (98) are used as an example. As long as the monitor menus to be set (any of the departure-time monitor, the return-time monitor, and the all item monitor) or mail menu (mail 1, mail 2, and mail 3) can be selected, and which of the monitor items is to be associated can be selected, there are no special limitations on detail contents of the monitor item setting screen and the mail setting screen, and users' setting and input methods.

What is claimed is:

1. A vehicle remote monitoring system comprising:
    a communication terminal including
        at least one switch unit configured to request vehicle information about a vehicle or its surroundings, the switch unit being associated with plural pieces of the vehicle information;
        a first transceiver;
        a first processor cooperatively operable with the first transceiver and the at least one switch unit, the first processor being configured to facilitate
            receiving an indication that the switch unit is operated,
            transmitting, from the first transceiver to the vehicle, a request signal indicating a request for vehicle information corresponding to the operated switch unit, when the indication that the switch unit is operated is received,
            receiving the vehicle information from the first transceiver, and
            outputting the vehicle information transmitted from the vehicle in response to the request signal;
    a vehicle information communication device, mounted in the vehicle, including
        a second transceiver;
        a second processor cooperatively operable with the second transceiver, the second processor being configured to facilitate
            receiving the request signal over the second transceiver,
            obtaining the vehicle information corresponding to the request signal upon receiving the request signal from the communication terminal, and
            wirelessly transmitting the vehicle information from the second transceiver to the communication terminal upon receiving the request signal from the communication terminal,
        the second processor being configured to retrieve the plural pieces of vehicle information and to wirelessly transmit the plural pieces from the second transceiver to the communication terminal upon receiving the request signal corresponding to the switch unit associated with the plural pieces of vehicle information; and
    a relay device that relays communications between the communication terminal and the vehicle information communication device,
    wherein the relay device wirelessly transmits a relay request signal corresponding to the request signal to the vehicle when receiving the request signal from the communication terminal, and transmits the vehicle information to the communication terminal when receiving the vehicle information corresponding to the relay request signal from the vehicle,
    wherein the communication terminal transmits the request signal to the relay device and receives the vehicle information transmitted from the relay device, and
    wherein the vehicle information communication device receives the relay request signal transmitted from the relay device in exchange for the request signal from the communication terminal, and obtains the vehicle information corresponding to the received relay request signal and wirelessly transmits the information to the relay device,
    wherein the relay device is configured to
        transmit an inquiry signal when a preset time passes, the inquiry signal indicating an inquiry about whether to transmit, to the communication terminal, vehicle information set in advance correspondingly to the time,
        transmit the relay request signal corresponding to the vehicle information to the vehicle information communication device when a response signal indicating transmission is transmitted from the communication terminal in response to the inquiry signal, and
        relay the vehicle information transmitted from the vehicle information communication device in response to the relay request signal and transmits the information to the communication terminal, and
    wherein the communication terminal includes a response input unit for a user to respond to the inquiry signal, the communication terminal being configured to
        transmit the user's response contents by the response input unit to the relay device as the response signal, and
        output the vehicle information when receiving the vehicle information for the response signal.

2. The vehicle remote monitoring system according to claim 1,
    wherein each switch unit is constructed with a mechanical switch.

3. The vehicle remote monitoring system according to claim 1,
    wherein correspondence between each switch unit and the vehicle information is selectable by a user.

4. The vehicle remote monitoring system according to claim 1, wherein:
    the communication terminal includes an operation device;
    the operation device includes the switch unit and an operation signal transmitting unit that transmits an operation signal corresponding to the operated switch unit when the switch unit is operated; and
    the first transceiver includes an operation signal receiving unit that receives an operation signal from the operation device, a request signal transmitting unit that transmits the request signal corresponding to a switch unit operated in the operation device based on the operation signal when the operation signal is received in the operation signal receiving unit, a vehicle information receiving unit that receives the vehicle information, and a vehicle information outputting unit that outputs the vehicle information received by the vehicle information receiving unit.

5. A vehicle remote monitoring system comprising:
a communication terminal including
at least one switch unit configured to request vehicle information about a vehicle or its surroundings, the switch unit being associated with plural pieces of the vehicle information;
a first transceiver;
a first processor cooperatively operable with the first transceiver and the at least one switch unit, the first processor being configured to facilitate
receiving an indication that the switch unit is operated,
transmitting, from the first transceiver to the vehicle, a request signal indicating a request for vehicle information corresponding to the operated switch unit, when the indication that the switch unit is operated is received,
receiving the vehicle information from the first transceiver, and
outputting the vehicle information transmitted from the vehicle in response to the request signal; and
a vehicle information communication device, mounted in the vehicle, including
a second transceiver;
a second processor cooperatively operable with the second transceiver, the second processor being configured to facilitate
receiving the request signal over the second transceiver,
obtaining the vehicle information corresponding to the request signal upon receiving the request signal from the communication terminal, and
wirelessly transmitting the vehicle information from the second transceiver to the communication terminal upon receiving the request signal from the communication terminal,
the second processor being configured to retrieve the plural pieces of vehicle information and to wirelessly transmit the plural pieces from the second transceiver to the communication terminal upon receiving the request signal corresponding to the switch unit associated with the plural pieces of vehicle information,
wherein the vehicle information communication device is configured to obtain vehicle information set in advance correspondingly to time and to transmit the vehicle information to the communication terminal when a preset time passes, and
wherein the communication terminal is configured to output the vehicle information upon receiving the transmitted vehicle information.

6. The vehicle remote monitoring system according to claim 5,
wherein the vehicle information set in advance correspondingly to the time is information corresponding to each switch unit.

7. The vehicle remote monitoring system according to claim 5,
wherein each switch unit is constructed with a mechanical switch.

8. The vehicle remote monitoring system according to claim 5,
wherein correspondence between each switch unit and the vehicle information is selectable by a user.

9. The vehicle remote monitoring system according to claim 5, wherein:
the communication terminal includes an operation device;
the operation device includes the switch unit and an operation signal transmitting unit that transmits an operation signal corresponding to the operated switch unit when the switch unit is operated; and
the first transceiver includes an operation signal receiving unit that receives an operation signal from the operation device, a request signal transmitting unit that transmits the request signal corresponding to a switch unit operated in the operation device based on the operation signal when the operation signal is received in the operation signal receiving unit, a vehicle information receiving unit that receives the vehicle information, and a vehicle information outputting unit that outputs the vehicle information received by the vehicle information receiving unit.

10. The vehicle remote monitoring system according to claim 5, further comprising:
a relay device that relays communications between the communication terminal and the vehicle information communication device,
wherein the relay device wirelessly transmits a relay request signal corresponding to the request signal to the vehicle when receiving the request signal from the communication terminal, and transmits the vehicle information to the communication terminal when receiving the vehicle information corresponding to the relay request signal from the vehicle,
wherein the communication terminal transmits the request signal to the relay device and receives the vehicle information transmitted from the relay device, and
wherein the vehicle information communication device receives the relay request signal transmitted from the relay device in exchange for the request signal from the communication terminal, and obtains the vehicle information corresponding to the received relay request signal and wirelessly transmits the information to the relay device.

* * * * *